Patented June 15, 1926.

1,588,439

UNITED STATES PATENT OFFICE.

ALEXANDER BLUMFELDT, OF BASEL, SWITZERLAND, ASSIGNOR TO SOCIETY OF CHEMICAL INDUSTRY IN BASLE, OF BASEL, SWITZERLAND.

SULPHUR PHENOL RESINS AND PROCESS OF MAKING SAME.

No Drawing. Application filed July 31, 1923, Serial No. 654,930, and in Switzerland September 1, 1922.

If aromatic hydroxy compounds, such as for instance phenol, cresols, naphthols, are heated with sulphur to about 130–150° C., advantageously in the proportion of 1 molecule of hydroxy compound to two to three atoms of sulphur and in the presence of basic reacting substances, until the evolution of hydrogen sulphide ceases, there are obtained resins of yellow to brown color which are easily soluble in alcohol and alkali, but insoluble in hydrocarbons, for instance, benzine, ligroin, cyclohexane, and halogenated hydrocarbons, for instance, chloroform, ethylene chloride, and which, owing to their general properties, among others their fastness to light, are adapted especially as a substitute for shellac, for instance, for polishes or spirit varnishes (cf. U. S. Patent 1,435,801).

Resin-like products are also obtained if phenols are treated, preferably in presence of an organic solvent, such as carbon tetrachloride, and at low temperature, with disulphur dichloride (cf. British Patent 13657 of 1913, particularly page 3, first paragraph).

It has now been found that the phenol sulphur resins, obtained according to the above mentioned process of the U. S. Pat. 1,435,801 or any other process, for instance by employing sulphur halides, may be converted into derivatives which, in contradistinction to the parent resins, are insoluble in alcohol and alkali, but soluble in halogenated hydrocarbons, such as for instance, chloroform, ethylene chloride, and the like, as well as in hydroaromatic hydrocarbons, by introducing organic acid radicals into the above mentioned phenol sulphur resins.

The new resins are not different in their general appearance from the parent resins. Like these they are soluble in acetone, and insoluble in aliphatic hydrocarbons. They are soluble, however, in mixtures of aliphatic and aromatic hydrocarbons with halogenated or with hydroaromatic hydrocarbons. Furthermore, they dissolve in mixtures of acetone with solvents which have in themselves no dissolving power for said resins, such as alcohol, benzene.

The new resins have in their solubilities and in their general behaviour great similarity with the natural resinotannol esters that is acyl compounds of resin alcohols of the aromatic series containing hydroxyl groups (phenols) and are, in consequence, adapted for the same applications. By reason of their limited solubility and their durability and resistance against physical and chemical influences, as for instance, influences of the weather, mechanical strain, electrical potential differences, chemical reagents, they may with particular advantage be employed as protecting and insulating lacquers, impregnating materials, and the like. For increasing their elasticity the usual admixtures may be added, as for instance, triphenyl phosphate, camphor or substitution products thereof, as well as natural resins. As they can further be freely mixed in any proportions in certain solvents for instance ketones and hydroaromatic hydrocarbons with cellulose esters and rubber, they are also adapted for filling materials for cellulose ester and rubber goods, hardening agents for rubber, and the like.

By adding elastifying agents, or in combination with cellulose ester or rubber solutions, the new products find also ready applications as valuable adhesives. They are especially suitable as adhesives for paper and leather.

By employing certain solvents, such as for instance, benzyl alcohol, cyclohexanol, and the like, the new resins may also be dissolved in linseed oil, in which form they are particularly adapted for enamel lacquers.

The kind of acid radical to be introduced is of minor importance for the attainment of the desired purpose. Radicals of the aliphatic as well as of the aromatic acids, for instance the acetyl, stearyl, benzoyl, toluenesulpho, abietyl radical, all are alike suitable for the purpose.

The esterification takes place in the usual manner, either by employing the isolated acid halides, or acid anhydrides, respectively, or by means of the free acid in presence of a condensing agent, such as for instance, gaseous hydrochloric acid, thionyl chloride, phosphorous or sulphur halides, and so on.

In certain cases, for instance, if the acylation is effected by means of an acid halide, or if the resin to be treated has a high melting point, it is advantageous to carry out the reaction in the presence of a solvent, such as for instance, an aqueous solution of an alkali, pyridine, toluene, and the like. In the working up of the resin care must be taken that any excess of acid or alkali, as well as the solvent are completely removed. The drying is advantageously carried out at a temperature as low as possible, is necessary by employing a vacuum.

Example 1.

200 parts of the sulphur-phenol-resin obtained according to the process described in the U. S. Pat. 1,435,801 are melted in an apparatus in oil bath equipped with a reflux condenser, and slowly mixed with 80 parts of acetic anhydride, while stirring. The reaction mixture is heated to 150-180° C. until a sample of the resin, after having thoroughly been washed and dried, dissolves in chloroform completely leaving a clear solution, and until it is no longer soluble in alcohol. Then the acetic anhydride in excess and the acetic acid formed are distilled in vacuo, the residue, if necessary, washed with water and dried at a moderate temperature. The resin is from light yellow to brown yellow, and, according to the hardness of the product used as starting material, it melts at more or less high temperatures. It is freely soluble in acetone, cyclohexane, methylcyclohexane, chloroform, ethlene chloride, and other halogenated hydrocarbons, further in mixtures of benzene-chloroform, cyclohexane-benzene, and the like. It does not dissolve in alcohol, and alkalies.

Example 2.

300 parts of the sulphur-phenol-resin obtained according to the process described in the U. S. Pat. 1,435,801 are dissolved in 65 parts of sodium hydroxide and 2000 parts of water, and slowly mixed, while stirring, with 260 parts of benzoyl chloride, keeping the mass at a temperature not exceeding 8-10° C. The resin ester thus formed is first thoroughly washed with warm water, then with some alcoholic ammonia for the purpose of removing any traces of non-esterified resin and also acid impurities, and afterwards carefully dried while avoiding higher temperatures.

The resin obtained possesses the same properties as that described in Example 1.

Example 3.

300 parts of the resin obtained according to the process described in the U. S. Pat. 1,435,801 are dissolved, as described in Example 2, in aqueous alkali, mixed with 190 parts of p-toluenesulpho-chloride, and then heated to boiling. The resin ester which separates is repeatedly and thoroughly washed, first with hot water, as far as possible until neutral reaction is attained, and then with some alcoholic ammonia, and finally dried in a vacuum.

The properties of the resin thus obtained correspond with those of the products obtained according to Examples 1 and 2.

Example 4.

100 parts of α-naphthol-sulphur-resin obtained according to the process of the U. S. Pat. 1,435,801 (from 150 parts of α-naphthol, 25 parts of sulphur, and 1 part of sodium hydroxide) are dissolved in 50 parts of benzene, and, while stirring, slowly brought to reaction with 55 parts of acetic acid anhydride. The esterification being complete, the acetic acid and the water formed, as well as the benzene, are expelled in a vacuum.

The properties of the resin correspond with those of the products obtained according to Examples 1 to 3.

Example 5.

100 parts of resorcinol-sulphur-resin obtained according to the process of the U. S. Pat. 1,435,801 (from 110 parts of resorcinol, 64 parts of sulphur, and 7 parts of sodium hydroxide) are dissolved in an excess of caustic soda solution, and then mixed drop by drop, at a temperature not exceeding 10° C., and while vigorously agitating, with 140 grams of benzoyl chloride. The precipitated resin ester is washed, first with cold, then with warm, water until neutral reaction is attained, and, finally, dehydrated at a temperature as low as possible. Its properties in respect of solubility correspond with those of the products obtained in Example 1.

Example 6.

100 parts of the phenol-sulphur-resin obtained according to U. S. Pat. 1,435,801 are carefully melted in a closed vessel equipped with a reflux condenser, while applying an agitator. There are then added 200 grams of colophony or abietic acid, respectively, dissolved in 100 grams of benzene, and further slowly added drop by drop a solution of 120 grams of thionyl chloride in 100 grams of benzene. The mass is heated until the greatest part of the hydrochloric acid has escaped. The last traces of the acids are evaporated with the benzene in a vacuum, and the resin, now insoluble in alcohol, is poured on to metal plates.

Example 7.

300 parts of the sulphur-phenol-resin obtained from phenol, disulphur-dichloride, and benzene as a solvent (cf. the British Patent No. 13657/1913) are disssolved, after evaporation of the benzene, in an excess of alkali, and brought to reaction, at a temperature not exceeding 10° C., with 105 grams of acetyl chloride added drop by drop, while stirring. The precipitated resin ester is washed, first cold, then warn, with water until neutral reaction is attained, and, finally, carefully dried in a vacuum. It possesses the properties in respect of solubility similar to the resins hereinbefore described.

What I claim is:

1. The herein described process for the production of synthetic resins consisting in introducing organic acid radicals into sulphur-hydroxy-aromatic resins.

2. The herein described process for the production of synthetic resins consisting in introducing organic acid radicals into sulphur-phenol-resin.

3. The herein described process for the production of synthetic resins consisting in introducing the acetyl group into sulphur-hydroxy-aromatic resins.

4. The herein described process for the production of synthetic resins consisting in introducing the acetyl group into sulphur-phenol-resin.

5. The herein described process for the production of synthetic resins consisting in introducing in the presence of a solvent organic acyl groups into sulphur-hydroxy-aromatic resins.

6. The herein described process for the production of synthetic resins consisting in introducing in the presence of a solvent organic acyl groups into sulphur-phenol-resin.

7. As new products the herein described acylated sulphur hydroxy aromatic resins which are from yellow to dark brown in appearance, and are insoluble in alcohol, alkali, and aliphatic hydrocarbons, but soluble in halogenated hydrocarbons, such as, chloroform, ethlyene chloride, and the like, as well as in hydroaromatic hydrocarbons, furthermore, in acetone and mixtures of aliphatic and aromatic hydrocarbons with halogenated and with hydroaromatic hydrocarbons, in mixtures of acetone with solvents having in themselves no dissolving power, such as alcohol, and which, by employing certain solvents such as benzyl alcohol, cyclohexanol, and the like, dissolve in linseed oil, and which possess great resistance against physical and chemical influences.

8. As new products, the acetyl compounds of sulphur phenol resins, which are from light yellow to brown yellow in appearance, and are insoluble in alcohol, alkalies, aliphatic hydrocarbons, but are soluble in acetone, cyclohexane, methylcyclohexane and other hydroaromatic hydrocarbons, chloroform, ethylene chloride and other halogenated hydrocarbons, further in a mixture of benzene - chloroform, cyclohexane - benzene and other mixtures of aliphatic or aromatic hydrocarbons with halogenated or with hydroaromatic hydrocarbons, further in mixtures of acetone with alcohol, benzene, or other solvents such as benzyl alcohol, cyclohexanol, and the like having in themselves no dissolving power, and which when mixed with solvents such as benzylalcohol or cyclohexanol, dissolve in linseed oil, and which possess great resistance against physical and chemical influences.

In witness whereof I have hereunto signed my name this 14th day of July, 1923.

ALEXANDER BLUMFELDT.